United States Patent
Sakagami

(10) Patent No.: US 7,373,218 B2
(45) Date of Patent: May 13, 2008

(54) IMAGE DISTRIBUTION SYSTEM

(75) Inventor: Yoshiaki Sakagami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 806 days.

(21) Appl. No.: 10/928,406

(22) Filed: Aug. 30, 2004

(65) Prior Publication Data

US 2005/0057689 A1 Mar. 17, 2005

(30) Foreign Application Priority Data

Sep. 16, 2003 (JP) ............................. 2003-323236
Jul. 20, 2004 (JP) ............................. 2004-211011

(51) Int. Cl.
*G06F 19/00* (2006.01)

(52) U.S. Cl. ...................... 700/245; 700/248; 700/250; 700/258; 700/259; 600/200; 600/301; 600/483; 600/595; 348/460; 348/E7.086; 348/E7.088; 701/23; 701/25; 701/26; 701/28; 434/130; 434/153; 318/628

(58) Field of Classification Search ............... 700/245, 700/248, 250, 253, 258, 259; 318/628; 600/200, 600/301, 483, 595; 606/1, 130; 701/23, 701/25, 26, 28; 434/460, E7.086, E7.088
See application file for complete search history.

(56) References Cited

U.S. PATENT DOCUMENTS 6,535,793 B2 * 3/2003 Allard ........................ 700/259
6,845,297 B2 * 1/2005 Allard ........................ 700/259

FOREIGN PATENT DOCUMENTS

JP 2003-6532 1/2003

OTHER PUBLICATIONS

Johns Hopkins Medical Institutions, Dr. Robot Tested at Hopkins, 2003, Internet, p. 1-2.*
Bluetooth, Socket's Bluetooth Strategy, The world is your network, 2001, Internet, p. 1-34.*

* cited by examiner

*Primary Examiner*—Khoi H. Tran
*Assistant Examiner*—McDieunel Marc
(74) *Attorney, Agent, or Firm*—Squire, Sanders & Dempsey L.L.P.

(57) ABSTRACT

An information distribution system capable of presenting an image photographed by a moving body, such as a robot or vehicle, selected by a user. The information distribution system includes moving bodies, local managers, and a global manager. When a user requests a connection with one of the moving bodies to the global manager through a portable terminal such as a portable phone, a menu generation section of the global manager generates a menu screen, and sends it to the portable terminal. The user selects one from the moving bodies through the menu screen, so that the portable terminal of the user connects with the selected moving body. An image photographed by a camera of the moving body is sent to the local manager, and information related to the image is superimposed on the image. Consequently, the superimposed image is sent to the portable terminal.

6 Claims, 18 Drawing Sheets

FIG.4

| POSITION | CONTENTS |
|---|---|
| P1 | THIS IS THE O× DEPARTMENT STORE ! WE WILL SHOW YOU ! |
| P2 | MOUSE. PNG |
| P3 | HERE IS THE SALES EVENT ! IT WILL LAST TILL THE 15th ! |
| P4 | ・ ・ ・ ・ ・ |
| ・ | ・ |
| ・ | ・ |
| ・ | ・ |

FIG.6

| POSITION (SUB-GOAL) | | | FACE ORIENTATION | | PAUSE TIME | SPEED | GESTURE |
|---|---|---|---|---|---|---|---|
| CODE | X COORDINATE | Y COORDINATE | H | V | | | |
| P1 | 800 | −900 | 0 | 0 | 0 | 3 | — |
| P2 | 700 | −800 | 0 | 0 | 2 | 3 | HELLO |
| P3 | 550 | −750 | 0 | 60 | 15 | 2 | NOD |
| ⋮ | ⋮ | ⋮ | | | | | |
| | | | | | | | |
| | | | | | | | |

FIG.7

| ROBOT | GEOGRAPHIC POSITION | CONNECTED NUMBER | CONNECTABLE NUMBER | UTILIZED POSSIBILITY | CONNECTED DESTINATION |
|---|---|---|---|---|---|
| R1 | O× DEPARTMENT STORE | 5 | 6 | O | 212.198.0.1 |
| R2 | ×× PARK | 2 | 5 | O | 125.213.9.15 |
| R3 | △△ AQUARIUM | 0 | 1 | O | 201.111.15.19 |
| R4 | . | 3 | 3 | × | . |
| . | . | . | . | . | . |
| . | . | . | . | . | . |
| . | . | . | . | . | . |

FIG.14

| POSITION | CONTENTS |
|---|---|
| P1 | AROUND S-CURVE |
| P2 | AROUND DEGNER CURVE |
| P3 | AROUND BACK STRETCH |
| P4 | .... |
| . | . |
| . | . |
| . | . |

FIG.15

| ID | VEHICLE NAME | CONNECTED NUMBER | CONNECTABLE NUMBER | UTILIZED POSSIBILITY | CONNECTED DESTINATION |
|---|---|---|---|---|---|
| V1 | VEHICLE 1 | 3 | 4 | ○ | 131.245.1.12 |
| V2 | VEHICLE 2 | 2 | 3 | ○ | 201.198.1.0 |
| V3 | VEHICLE 3 | 1 | 4 | ○ | 212.192.2.20 |
| V4 | VEHICLE 4 | 2 | 2 | × | 192.167.1.219 |
| . | . | . | . | . | . |
| . | . | . | . | . | . |
| . | . | . | . | . | . |

IMAGE DISTRIBUTION SYSTEM

BACKGROUND OF THE INVENTION

1. Field of the Invention

A system consistent with the present invention relates to an image distribution system.

2. Description of the Related Art

In recent years, robots have become increasingly developed, and have been adapted for specific applications, including; pets, household use and dangerous-work use. To give an example, it is suggested that a robot for household use is disposed in a house, office or building, and a user can operate this robot through a portable terminal so as to remotely communicate with persons around the robot or to receive, through the portable terminal, pictures photographed by the robot, thereby perceiving situations around the robot (refer to Japanese Unexamined Patent Application Publication No. 2003-006532 (paragraphs 0005 to 0007, FIG. 3)).

However, such conventional techniques are centered on an operation of a robot through a portable terminal, and the robot is designed only to monitor images photographed by a camera provided on itself through the portable terminal. Additionally, the number of robots which a user can access through a portable terminal is confined to one, and the user can, therefore, know only about information sensed by this single robot.

SUMMARY OF THE INVENTION

In consideration of the above disadvantages, the present invention has been made. The present invention is concerned with an image distribution system which enables presentation of useful information to users through a robot which is regarded as a movable information presenting means.

Additionally, the present invention is concerned with an image distribution system applicable not only to robots, but also to a wide range of moving bodies such as vehicles.

An aspect of the present invention is to provide an image distribution system including a plurality of robots as moving bodies, a content server, a plurality of local managers for managing operations of the robots, and a global manager for managing communication connections between the robots and the portable terminals.

Each robot is constituted as follows:
(a) a biped walking self-moving device for operating in accordance with an instruction from a corresponding local manager of the local managers;
(b) an instruction input section for receiving an instruction on movement of the self-moving device;
(c) a camera; and
(d) an image output section for outputting an image photographed by the camera to the local manager.

Furthermore, each local manager is constituted as follows:
(a) an image input section for receiving the image outputted from a corresponding robot of the robots;
(b) a global map for setting an action plan of the robot;
(c) an action instruction section for directing the robot to take an action, based on the global map;
(d) an information collection section for receiving, from the content server, contents being related to a current geographic position of the robot, based on the global map;
(e) an information superimposing section for producing superimposed data in which the contents received by the information collection section is superimposed on the image received by the image input section;
(f) an image sending section for sending the superimposed data to a corresponding portable terminal of the portable terminals; and
(g) a connection management section for sending, to the global manager, connection information for determining possibility of a connection with the robot.

Moreover, the global manager is constituted of a menu generation section. Incidentally, when receiving a connection request from one portable terminal out of the portable terminals, the menu generation section generates a menu screen to be displayed on the portable terminal, based on pieces of the connection information sent from the local managers and, substantially sends, to the portable terminal, the menu screen including at least a utilization selection section of the robots.

According to the above-described image distribution system, the biped walking robot acts in accordance with an instruction of the local manager based on the global map. Further, when a user requests a connection with the global manager through a portable terminal, a menu screen containing a utilization selection portion of the robots is displayed on a screen on the portable terminal. The portable terminal of the user can connect with the robot by selecting one from the robots displayed on the screen. An image photographed by the camera of the robot is outputted to the local manager. The local manager uses the information collection section to receive, from the content server, contents related to a current geographic position of the robot, based on the global map, and uses the information superimposing section to superimpose the contents on the image received from the robot. The superimposed data is sent to the portable terminal of the user through the image sending section. Consequently, the user can view the information in which on the image photographed by the camera of the robot, the contents related to the image are superimposed.

Additionally, it is preferable that each of the robots further includes a face recognizing section for recognizing a position of a face of a person in the image photographed by the camera, and ones of the robots and the local managers each further include a cover-up processing section for hiding the face in the image, based on the position of the face of the person recognized by the face recognizing section With the above arrangement, the superimposed data in which the position of the face is hidden is produced, and is then sent to the portable terminal of the user. This enables protection of privacy of photographed persons.

It is preferable that both the robots and the local managers each include a private line communicating device for performing short-length communication therebetween and a public line communicating device for connecting therebetween through a public line. Further, each of the local managers includes a communication switching section which refers to the global map to thereby determine whether the current geographic position of the robot is located within a connectable area of the private line communicating device, and which switches between the private line communicating device and the public line communicating device in such a manner that the private line communicating device communicates with the robot on the condition that the robot is determined to be located within the connectable area and that the public line communicating device communicates with the robot on the condition that the robot is determined to be located outside the connectable area.

With the above arrangement, the communication switching section of the local manager switches between the private and public line communicating devices, depending on the position of the robot. This enables the robot to be moved throughout a broad area, without causing breakdown of the communication and reduction in communicating costs incurred due to use of a public line.

Additionally, the action instruction section directs the robot to take an action, based on an operation instruction sent from one of the portable terminals, and, upon receipt of operation instructions from the portable terminals at the same time, selects one from the portable terminals in a predetermined manner, so that the user can operate the robot through the local manager by the portable terminal.

Incidentally, the portable terminal which has sent operation instructions most frequently in the portable terminals during a predetermined period may be selected by the action instruction section.

Another aspect of the present invention is to provide an image distribution system including a plurality of moving bodies, each including an image processing section and a local manager, a plurality of portable terminals, a global manager for managing communication connections between the moving bodies and the respective portable terminals, and a content server.

Each image processing section is constituted as follows:
(a) a camera; and
(b) an image output section for outputting an image photographed by the camera.

Each local manager is constituted as follows:
(a) a data input section for receiving the image outputted by the image output section;
(b) an information collection section for receiving, from the content server, contents related to its own current geographic position;
(c) an information superimposing section for producing superimposed data in which the contents received by the information collection section are superimposed on the image received by the image input section;
(d) an image sending section for sending the superimposed data to a corresponding portable terminal of the portable terminals; and
(e) a connection management section for sending, to the global manager, connection possibility information being used for determining possibility of a connection with the portable terminal.

The global manager includes a menu generation section which, upon receipt of a connection request from one portable terminal out of the portable terminals, generates a menu screen to be displayed on the portable terminal, based on pieces of the connection possibility information sent from the local managers, and which subsequently sends, to the portable terminal, the menu screen containing at least a utilization selection portion for the moving bodies.

Thanks to this information distribution system, a user can select one from the moving bodies set up beforehand to thereby view, through a portable terminal, images photographed by the camera being installed in the selected moving body.

BRIEF DESCRIPTION OF THE DRAWINGS

For a more complete understanding of the present invention and the advantages hereof, reference is now made to the following description taken in conjunction with the accompanying drawings wherein:

FIG. 4 is a view depicting contents of data in a content server CS;

FIG. 6 is a view depicting contents of the global map 21;

FIG. 7 is a view depicting contents of robot management data 31;

FIG. 14 is a view depicting contents of data in a content server CS;

FIG. 15 is a view depicting contents of a vehicle management data 91;

DETAILED DESCRIPTION OF THE EXEMPLARY EMBODIMENTS OF THE INVENTION

Figure 1:
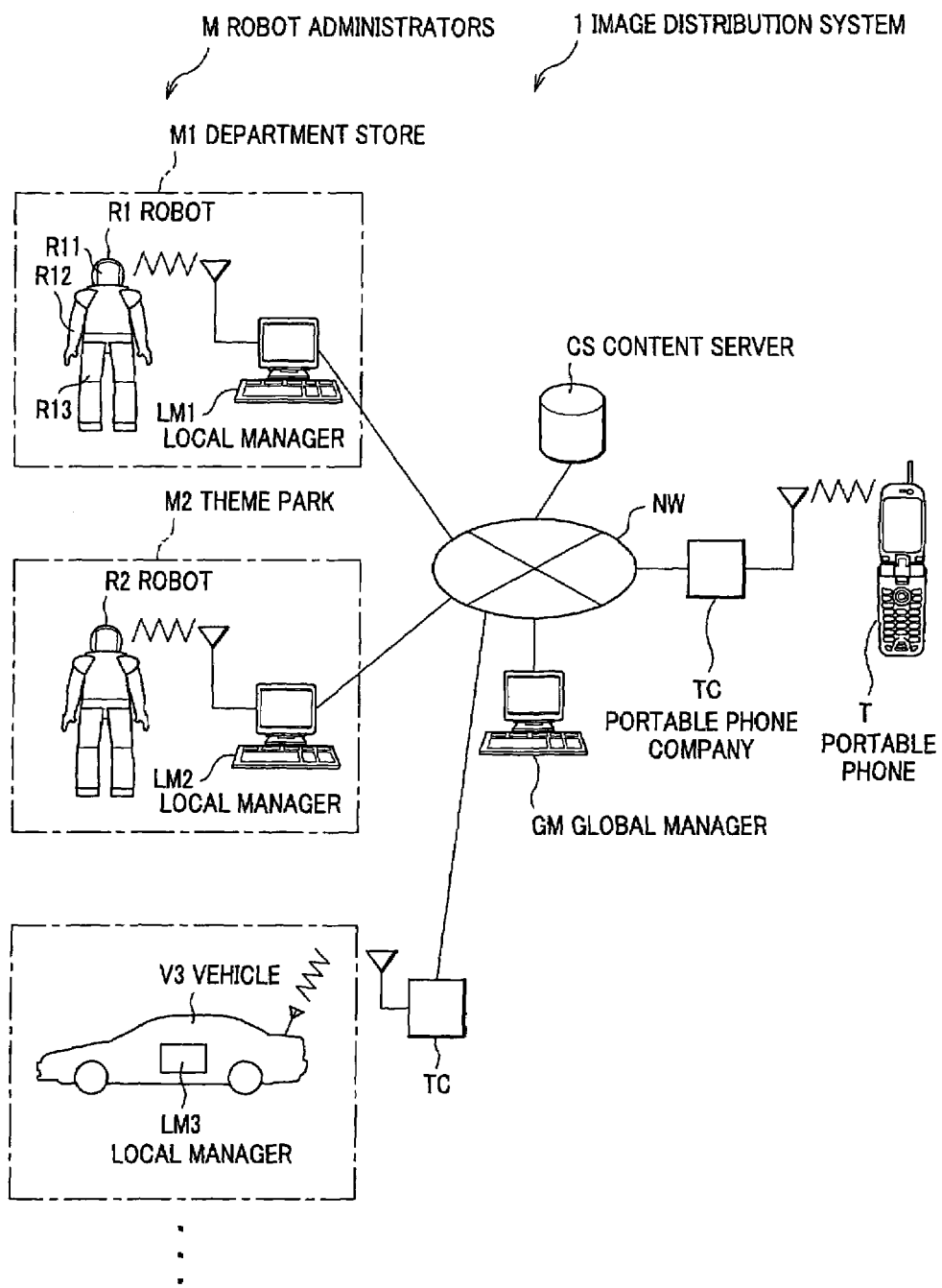
FIG. 1 is a view depicting a structure of an image distribution system according to the present invention.

Embodiments of the present invention will be described below in detail with reference to attached drawings as appropriate. FIG. 1 shows a structure of an image distribution system according to the embodiment of the present invention.

Here, the embodiments will be described of the cases where a moving body is a robot and where a moving body is a vehicle.

(In the Case Where the Moving Body is a Robot)

As shown in FIG. 1, an image distribution system 1 includes respective robots R1, R2, . . . that are owned by robot administrators M (M1, M2, . . . ), local managers LM (LM1, LM2, . . . ) that manage the respective robots Rn, a global manager GM, a portable phone T as a portable terminal owned by a user, and a content server CS. Thereinafter, if not stated otherwise, the robots R1, R2, . . . are referred to as "robots Rn", the robot administrators M (M1, M2, . . . ) are referred to as "robot administrators M", and the local managers LM are referred to as "local managers LMn".

Among these components, the local managers LMn, the global manager GM and the content server CS are connected to one another through a network NW, and the portable phone T is also connected to the network NW through a connecting device owned by a portable phone company TC.

The robot administrators M provide advertisements or information by use of the robots Rn, and include a department store M1 and a theme park M2, for example. The robot R1 is disposed in the department store M1, and is managed by the local manager LM1. Similarly, the robot R2 is disposed in the theme park M2, and is managed by the local manager LM2.

A description will be given below of structures of the robot R1, the content server CS, the local manager LM1 and the global manager GM. Incidentally, since the robot R2 and the local manager LM2 are similar to the robot R1 and the local manager LM1, respectively, a description therefor will be omitted.

[Robot R1]

Figure 2:
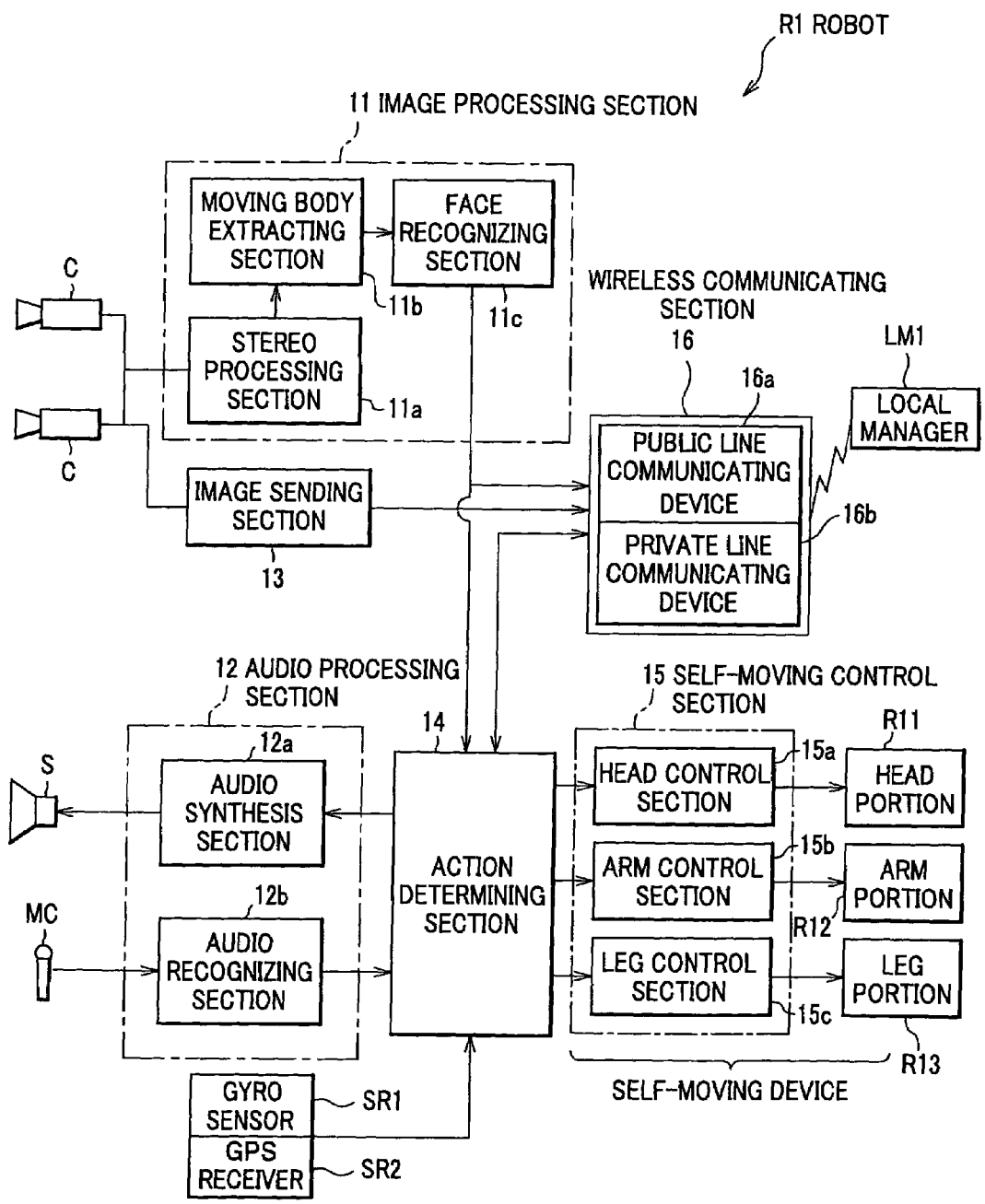
FIG. 2 is a view depicting a block diagram of a robot R1.

As shown in FIG. 1, the robot R1 is a self-moving type biped walking robot, and is provided with a head portion R1, an arm portion R12, and a leg portion R13, which are driven by respective actuators, and its bipedal walking operation is controlled by a self-moving control section 15 (see FIG. 2). A detail of this biped walking robot is disclosed in, for example, Japanese Unexamined Patent Application Publication No. 2001-62760.

FIG. 2 shows a block diagram of the robot R1. As shown in FIG. 2, the robot R1 is provided with cameras C, C, a speaker S, a microphone MC, an image processing section 11, an audio processing section 12, an image sending section 13, an action determining section 14, a self-moving control section 15 and a wireless communicating section 16, in addition to the head portion R11, the arm portion R12 and the leg portion R13. Moreover, the robot R1 is further provided with a gyro sensor SR1 and a GPS receiver SR2 which both detect a geographical position of the robot R1 itself.

The cameras C, C capture images in digital data format, and each may be a color CCD (charge-coupled device) camera, for example. The cameras C, C are arranged alongside each other, and each output the photographed data to the image processing section 11 and the image sending section 13. The cameras C, C, the speaker S and the microphone MC are arranged inside the head portion R11.

The image processing section 11 treats images photographed by the cameras C, C and recognizes obstacles and persons in the images in order to realize situations around the robot R1. The image processing section 11 includes a stereo processing section 11a, a moving body extracting section 11b and a face recognizing section 11c, as components related to the present invention.

The stereo processing section 11a pattern-matches respective two images photographed by the cameras C, C by using any one of the two images as the reference, calculates parallaxes between pixels in the reference image and corresponding pixels in the other, thereby producing a parallax image, and outputs the produced parallax image and the two original images to the moving body extracting section 11b. This parallax is related to a distance between the robot R1 and a subject photographed by the cameras C, C.

The moving body extracting section 11b takes out a moving body from the image, based on the images outputted from the stereo processing section 11a. The reason why a moving body is taken out is to recognize a person, based on the premise that a moving body is a person. To take out a moving body, the moving body extracting section 11b stores beforehand a series of images having been photographed in past, pattern-matches the images by comparing the latest image with the past images, and calculates the moving amounts of the respective pixels in these images. As a result, a moving amount-related image is produced.

The moving body extracting section 11b uses the parallax image and the moving amount-related image to estimate, based on the moving amounts of the pixels, an existence of a person within an area away from the cameras C, C by a predetermined distance. If estimating an existence of a person, then the moving body extracting section 11b takes out the moving body from the images, and outputs the image of the moving body to the face recognizing section 11c.

The face recognizing section 11c receives the image of the moving body, takes out skin-colored parts therefrom, and recognizes the position of the face, based on sizes, shapes, etc. of the parts. Also, positions of hands are recognized in the similar manner.

The face recognizing section 11c outputs the information about the position of the face to the action determining section 14 in order to use this information when the robot R1 moves or when it communicates with the recognized person. Moreover, the face recognizing section 11c outputs the information to the wireless communicating section 16, and the wireless communicating section 16 then receives and sends it to a local manager LM1.

The audio processing section 12 includes an audio synthesis section 12a and an audio recognizing section 12b. The audio synthesis section 12a generates audio data from its character information, based on an instruction of a speech action determined/outputted by/from the action determining section 14, and outputs the audio data to the speaker S. This audio data is generated based on a relationship between the character information and the corresponding audio data, which is stored in the audio synthesis section 12a in advance.

The audio recognizing section 12b receives audio data from the microphone MC, generates character information from the received audio data, based on a relationship between the audio data and corresponding character information, which is stored beforehand in the audio recognizing section 12b, and outputs the generated character information to the action determining section 14.

The image sending section 13 outputs the image data received from the cameras C, C to the local manager LM1 through the wireless communicating section 16. Here, both the image sending section 13 and the wireless communicating section 16 serve as an image output section.

The self-moving control section 15 includes a head control section 15a, an arm control section 15b, and a leg control section 15c, which drive the head portion R11, the arm portion R12 and the leg portion R13, respectively, in accordance with an instruction from the action determining section 14.

Here, the self-moving control section 15, the head portion R11, the arm portion R12 and the leg portion R13 serve as a self-moving device.

The gyro sensor SR1 and the GPS receiver SR2 sense data and output the sensed data to the action determining section 14. This data is used to determine an action of the robot R1, and is sent by the action determining section 14 to the local manager LM1 through the wireless communicating section 16.

The wireless communicating section 16 sends/receives data to/from the local manager LM1, and includes a public line communicating device 16a and a private line communicating device 16b.

The public line communicating device 16a is a wireless communicating means using public lines such as portable phone lines or PHS (personal handy phone system) lines. Meanwhile, the private line communicating device 16b is a charge-free or low-charged wireless communicating means for performing a short distance wireless communication, such as wireless LANs compliance with IEEE802.11b. The wireless communicating section 16 selects one from the public line communicating device 16a and the private line communicating device 16b in response to a connection request from the local manager LM1, and performs a data communication with the local manager LM1.

Here, the wireless communicating section 16 serves as an instruction input section.

[Content Server CS]

Figure 3:
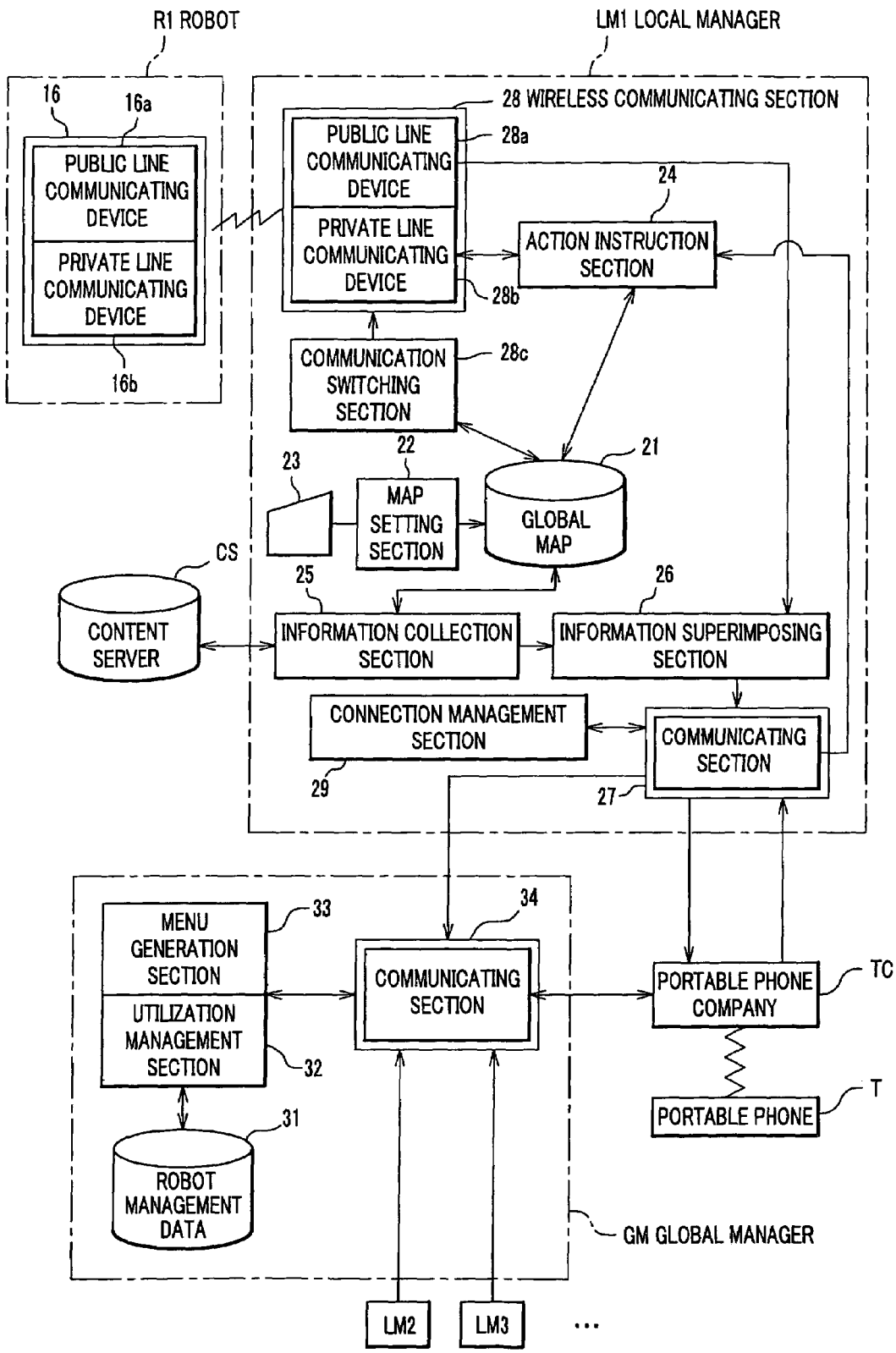
FIG. 3 is a functional block diagram of a local manager LM1 and a global manager GM.

FIG. 3 shows a functional block diagram of the local manager LM1 and the global manager GM, and FIG. 4 shows contents of data in the content server CS.

As shown in FIG. 3, the content server CS is accessed from the local manager LM1. The content server CS is constituted of, for example, a database server or a web server, but may be any type of server as long as being accessible from the local manager LM1. Further, the content server CS may be set up inside the local manager LM1, the robot R1 or the global manager GM.

The content server CS stores data containing geographic positions of the robot R1 and contents corresponding to the positions, as an example shown in FIG. 4. In this example, character information "Here is the sales event! It will last till the 15th!" is stored at a location P3, and a name of an image file "MOUSE. PNG" is stored at a location P2. Incidentally, the content server CS may not be provided by the robot administrators M, etc., but may be a public web server instead. For example, a URL (uniform resource locators) of a referred site is registered in a global map 21 in advance, and an information collection section 25 may access a web server at this URL to collect information therefrom. This is how, the content server CS is merely an optional component in the image distribution system 1.

[Local Manager LM1]

The local manager LM1 includes the global map 21, a map setting section 22, an input device 23, an action instruction section 24, the information collection section 25, an information superimposing section 26, a communicating section 27, the wireless communicating section 28 and a communication switching section 28c, as shown in FIG. 3.

Figure 5:
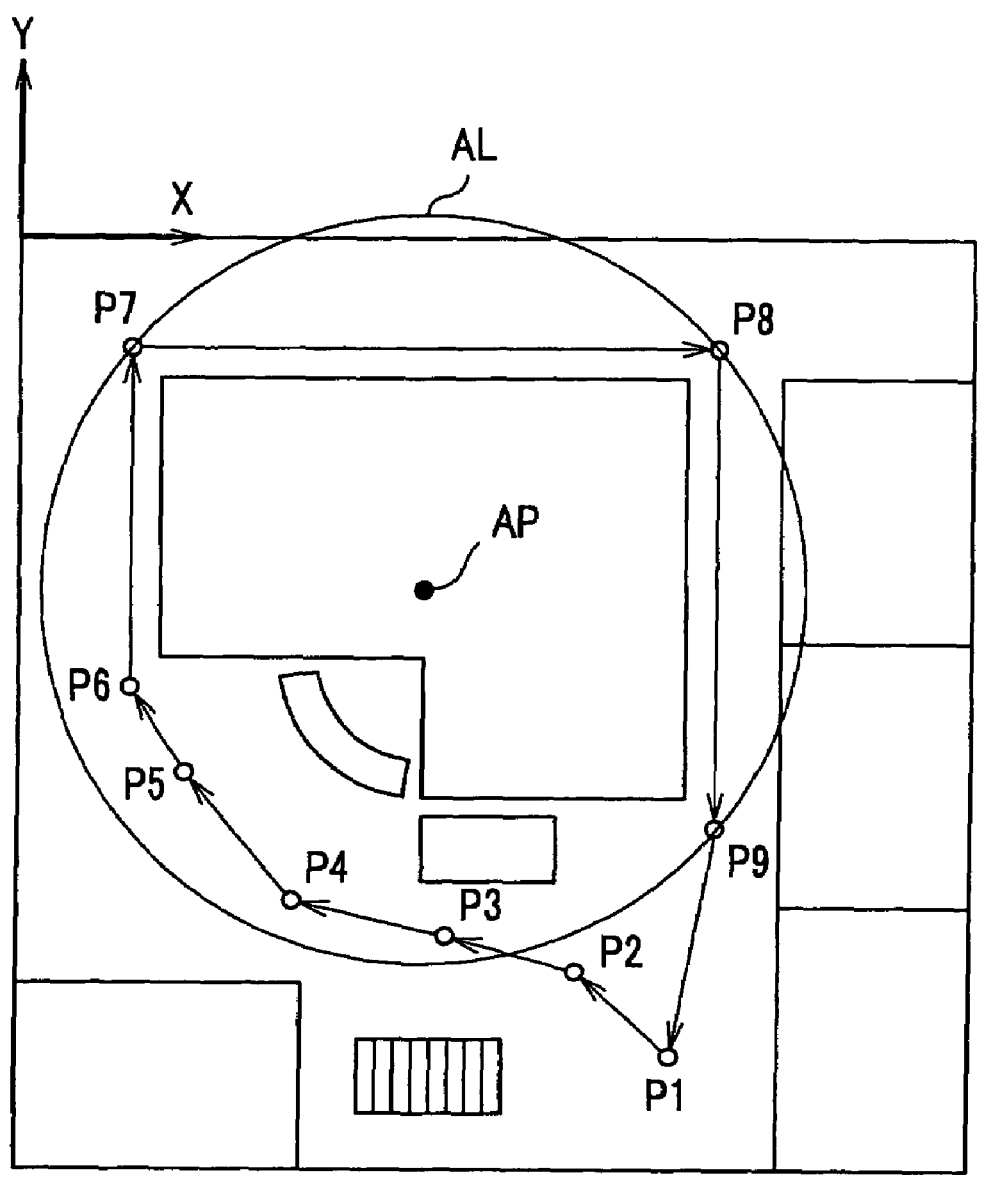
FIG. 5 is a view depicting a setting screen of a global map 21.

The global map 21 serves as a data base in which action plans of the robot R1 are set. FIG. 5 shows a setting screen of the global map 21, and FIG. 6 shows contents of the global map 21. The map setting section 22 presents the setting screen as shown in FIG. 5, and displays, with reference to the global map 21, target moving positions (referred to as "sub-goals") of the robot R1 set on the global map 21, and the input device 23 makes it possible to edit information related to the sub-goals, such as information about operations of arms of the robot R1. Also, the sub-goals can be edited.

An example of a setting screen that displays an interior of a room, based on map data maintained in the global map 21, and target points P1 to P9 where the robot R1 will head for is shown in FIG. 5. The robot R1 is directed to move to the next sub-goal every time reaching the sub-goal.

In FIG. 5, a point AP shows an access point of the local manager LM1, that is, an electric waves emitting point of the private line communicating device 28b (see FIG. 3). Moreover, an area within a circle AL with the center of a point AP, which is an area away from the point AP by a predetermined length, indicates a connecting area where the private line communicating device 28b can communicate with the robot R1.

As shown in FIG. 6, the contents of the global map 21 have the fields in which "POSITION (SUB-GOAL) ", "FACE ORIENTATION", "PAUSE TIME", "SPEED" and "GESTURE" are set. "POSITION (SUB-GOAL)" is defined by a code, and X, Y coordinates. The code represents the geographic position of the robot R1, and is displayed on the setting screen (see FIG. 5). The X, Y coordinates have an origin at the upper-left corner of the setting screen as shown in FIG. 5, and locate the positions of the sub-goals.

"FACE ORIENTATION" is the field in which the orientation of head portion R11 of the robot R1 is set, and is defined by horizon and vertical angles H, V.

"PAUSE TIME" represents a time period during which the robot R1 pauses at each sub-goal, and is set in units of seconds.

"SPEED" is the field in which the speed of the robot R1 heading for each sub-goal is set in units of meters per hour.

"GESTURE" represents a gesture made by the robot R1 when it reaches each sub-goal. The data about a specific motion of the robot R1 corresponding to each gesture is maintained in the self-moving control section 15 in the robot R1 (not shown).

As described above, in the global map 21, the motions of the robot R1 corresponding to the sub-goals are set. Incidentally, the above setting fields are merely parts of total fields, and for example, the current position is contained in another field. Additionally, if these fields contain the contents of the content server CS described above, then the global map 21 can incorporate the function of the content server CS.

The action instruction section 24 shown in FIG. 3 sends instructions of walking, gesture, etc. to the robot R1 through the wireless communicating section 28, based on the data in the global map 21. Also, the action instruction section 24 receives the information about the geographic position of the robot R1 from the robot R1 through the wireless communicating section 28, and renders the global map 21 memorize the received information. Further, the action instruction section 24 refers to the setting fields in the global map 21 while confirming the current position of the robot R1 and, then determines a next instruction.

Furthermore, when a user sends an instruction about the operation of the robot R1 to the local manager LM1 through the portable phone T, the action instruction section 24 receives this instruction through the communicating section 27, and sends the received command to the robot R1 through the wireless communicating section 28. However, if a plurality of users share the robot R1, then the action instruction section 24 selects one from the instructions of the users based on, for example, a majority rule (the number of each received instruction during a predetermined period) in order to avoid the interference of the instructions. Subsequently, the action instruction section 24 sends the selected instruction to the robot R1.

The information collection section 25 refers to a geographical position of the robot R1 stored in the global map 21, and simultaneously retrieves contents in accordance with the position of the robot R1 from the content server CS. Moreover, the information collection section 25 outputs the retrieved contents to the information superimposing section 26.

The information superimposing section 26 superimposes the content data received from the information collection section 25 on the image data sent from the robot R1. Such superimposed data may be generated by superimposing, on the image data, bitmap data of letters or of texts. Alternatively, if the portable phone T or another portable terminal can display documents of a format containing letters and images, such as HTML documents, then data to which tags are added may be generated so that the data is suited for this format. The data superimposed by the information superimposing section 26 is sent to the portable phone T through the communicating section 27 and the connecting device of the portable phone company TC.

The information to be superimposed, which is the contents stored in the content server CS, may not be only letter information but also an image. For example, when a user acquires the permission to operate the robot R1, the information to be superimposed may be an image showing operation buttons or visually described operational guidance. This information would facilitate user's operation.

The communicating section 27 communicates with the portable phone company TC (or portable phone T) and the global manager GM, and typically plays a role in connecting with the Internet. Incidentally, the communicating section 27 serves as an image sending section.

The wireless communicating section 28 performs wireless communication with the robot R1, and includes a public line communicating device 28a and a private line communicating device 28b. Since they are similar to the public line communicating device 16a and a private communicating device 16b, respectively, a detail description therefor will be omitted. Incidentally, the wireless communicating section 28 serves as an image input section.

The communication switching section 28c switches between the two communicating devices in the wireless communicating section 28. Specifically, the communication switching section 28c refers to the global map 21, and simultaneously determines whether the current position of the robot R1 stored in the global map 21 is located within the connecting area, which is away from the access point (point AP) by a predetermined distance. If so, then it allows the private line communicating device 28b to communicate with the robot R1. Otherwise, it allows the public line communicating device 28a to communicate therewith.

A connection management section 29 manages possibility of the connection with the portable phone T of the user, and manages the number of the portable phones T being in connection with the local manager LM1 at present. The connection management section 29 increments the number of the connections by one whenever another portable phone T connects with the local manager LM1, and decrements it by one whenever one of the connected portable phones T disconnects therefrom. Further, the connection management section 29 sends, to the global manager GM through the communicating section 27, the current number of the connections every time the number changes. Alternatively, the connection management section 29 determines the possibility of the connection and, then may send, to the global manager GM, only information about the possibility, in stead of the current number. Specifically, if the current number is less than a predetermined value, then the connection management section 29 sends, to the global manager GM through the communicating section 27, information on the approval of the connection. Otherwise, it sends information on the disapproval thereto.

Additionally, the connection management section 29 has a timer (not shown) therein to record the connected time of the user, and manages the connection so that each user cannot be in connection beyond a predetermined period.

Here, the local manager LM1 is aimed at not only setting the robot R1, but also dividing operations with the robot R1. Accordingly, the local manager LM1 is provided separately from the robot R1 in this embodiment. However, it may be incorporated in the robot R1, or the computer constituting the action determining section 14, etc. in the robot R1 may serve as the local manager LM1.

[Global Manager GM]

The global manager GM includes robot management data 31, a utilization management section 32, a menu generation section 33 and a communicating section 34.

The robot management data 31 is for managing the utilization of multiple robots Rn, and is stored in a memory device owned by the global manager GM.

FIG. 7 shows the contents of the robot management data 31. As shown in FIG. 7, the robot management data 31 contains information about "GEOGRAPHIC POSITION", "CONNECTED NUMBER", "CONNECTABLE NUMBER", "UTILIZED POSSIBILITY" and "CONNECTED DESTINATION" for each of the robots Rn (R1, R2, . . . ), using IDs of the robots Rn as keys.

The field of "GEOGRAPHIC POSITION" designates where the robots Rn are disposed, and contains character information regarding the geographic positions. Since this data is displayed when the robots Rn are selected, this field may also contain character information of easy comment explaining the geographic positions.

"CONNECTED NUMBER" designates the number of the portable phones T being in connection with the robots Rn at present.

"CONNECTABLE NUMBER" designates the number of the portable phones T which are set for each of the robots Rn and which are connectable to each of the robots Rn at the same time. This number is as same as that set in the connection management section 29 of each of the local managers LMn.

The field of "UTILIZED POSSIBILITY" contains, as a character of "o" or "x", information about whether the robots Rn can be used. This information may be another one such as "0" or "1" as long as the utilized possibility is identified. Here, if "CONNECTABLE NUMBER" for one of the robots Rn is set as 1, then only one user can exclusively use the one of the robots Rn, and if "CONNECTABLE NUMBER" therefor is more than 1, then a plurality of users share the one of the robots Rn.

The field of "CONNECTED DESTINATION" contains IP addresses of the robots Rn to be connected. "CONNECTED DESTINATION" may be a URL or a telephone number.

The utilization management section 32 manages the utilization of the robots Rn. The utilization management section 32 updates the number of the connections for each of the robots Rn in the robot management data 31, every time receiving the current number of the connections from each of the local managers LMn. Further, the utilization management section 32 compares the updated connectable number for each of the robots Rn with the current connected number therefor. If the connectable number is greater than the connect number, then the utilization management section 32 sets the utilized possibility as "o". Otherwise, "x".

Figure 8:
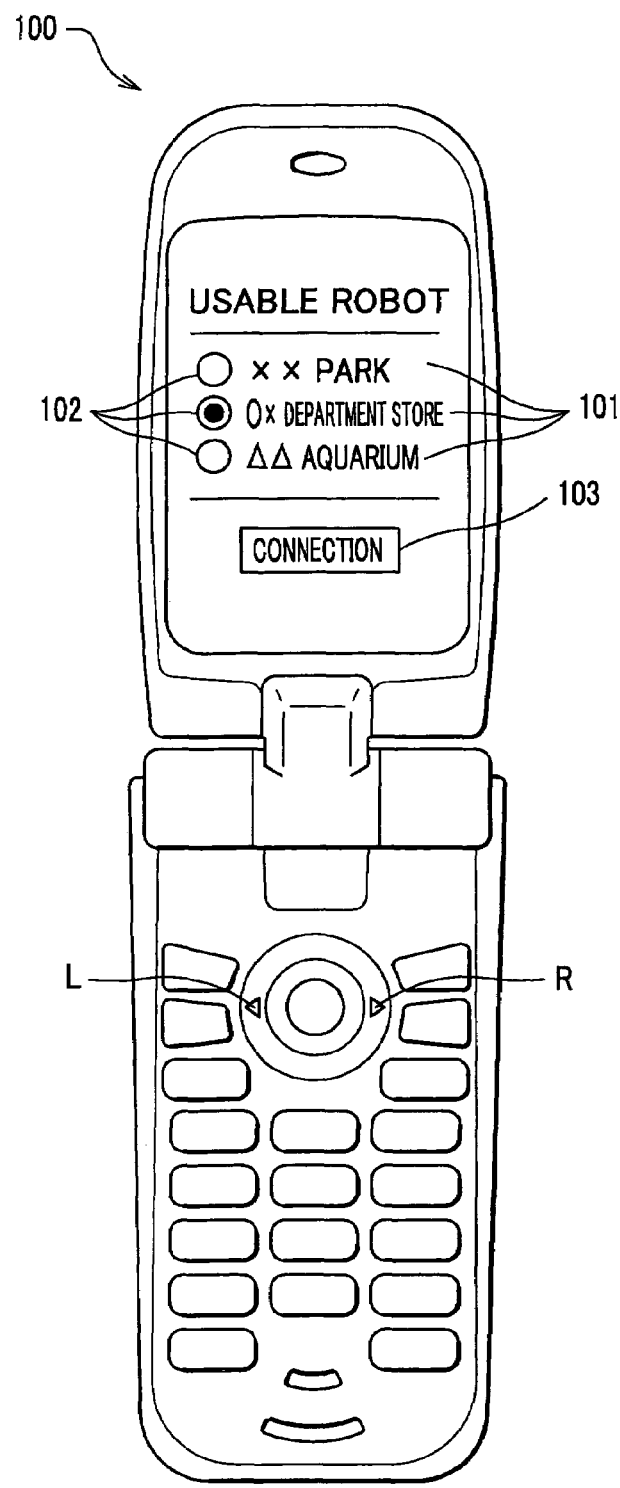
FIG. 8 is a view depicting an example of a menu screen.

When receiving a request of connection with the robots Rn from the user through the portable phone T, the menu generation section 33 produces a menu screen containing a utilization selection section of the robots Rn, and simultaneously sends data of the menu screen to this portable phone T. For example, the menu generation section 33 generates data for displaying a menu screen 100 as shown in FIG. 8.

Concretely, on receiving the request of the connection from the portable phone T through the communicating section 34, the menu generation section 33 reads the robot management data 31, and identifies the usable robots Rn from the field on "UTILIZED POSSIBILITY". Moreover, the menu generation section 33 generates character strings 101 for indicating where the usable robots Rn are disposed and data for indicating a selection form such as data radio buttons 102 aligned in a row. Additionally, the menu generation section 33 sets data of connected destinations of the robots Rn, such as IP addresses, as values selected by the radio buttons 102. Furthermore, the menu generation section 33 generates data for displaying a form of a connect button 103 on a part of the screen, and sets a connection to the value selected by the radio buttons 102 in response to the selection of the connect button 103.

The display format of the menu is not limited to this example, but may be a top down format which enables the user to select the robots Rn, or a format in which a connected destination is linked to the character string indicating where the robots Rn are disposed.

[Portable Phone T]

The portable phone T is an example of portable terminals, and may be replaced by a PDA (personal digital assistance) or a notebook personal computer.

Operations of the image distribution system 1 configured in such a manner will be described with reference to a flow chart of FIG. 11.

Figure 11:
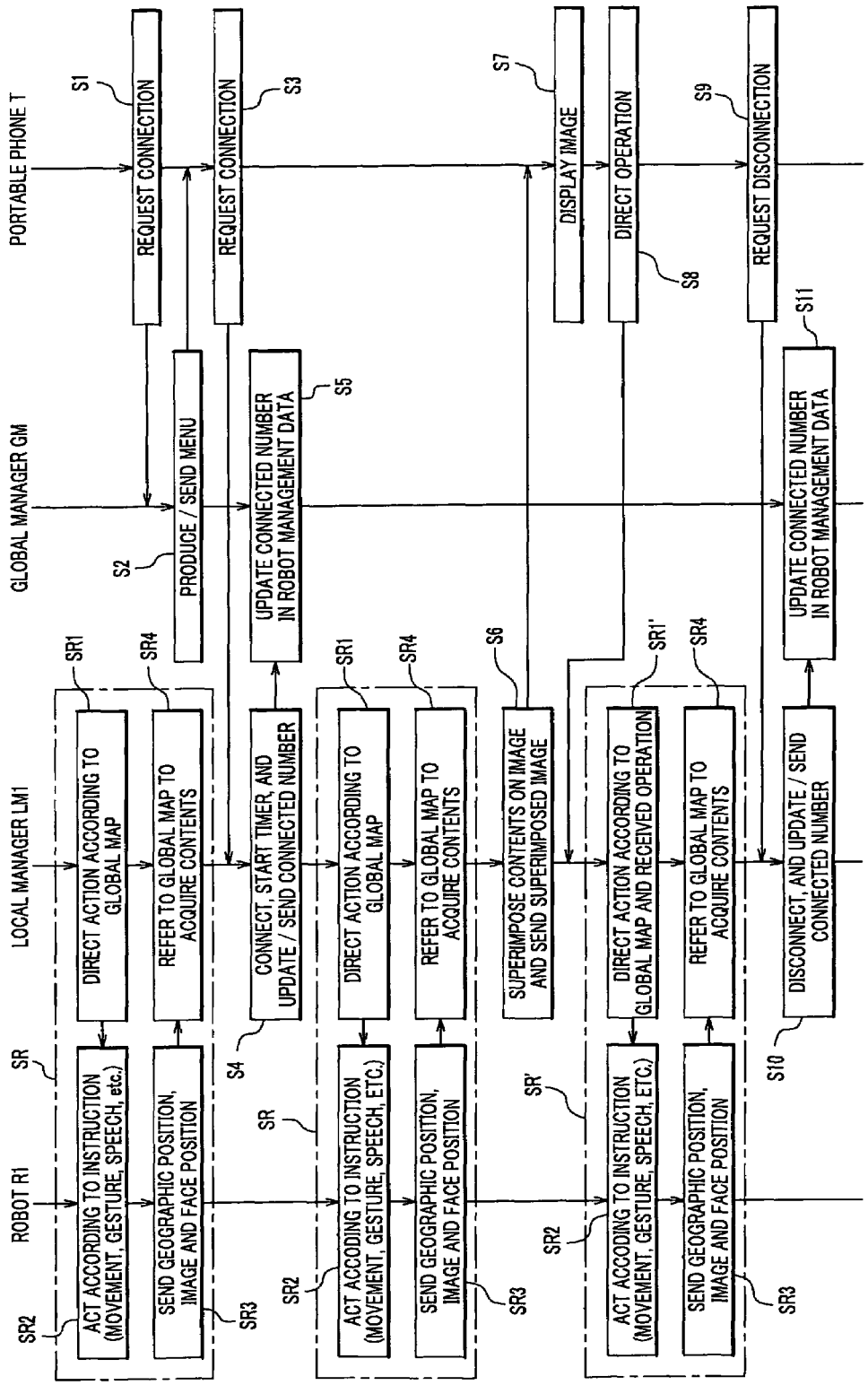
FIG. 11 is a flow chart showing an operation of the image distribution system 1 according to the present embodiment of the present invention.

FIG. 11 shows respective operations of the robot R1, the local manager LM1, the global manager GM and the portable phone T arranged in a row.

The action instruction section 24 in the local manager LM1 provides the robot R1 to an instruction of actions, in accordance with the action contents set in the global map 21 (STEP SR1). This instruction includes a position of a next sub-goal (coordinates) walking speed, a pause time period at the sub-goal, a face orientation, and gesture to be made, as shown in FIG. 6.

The communication switching section 28c appropriately switches the communicating means used for directing the robot R1 by the local manager LM1, depending on the geographic position of the robot R1. Specifically, if the current position of the robot R1 which is tracked with the global map 21 is located within an area a predetermined distance away from an access point set in the global map 21, then the local manager LM1 uses the private line communicating device 28b to communicate with the private line communicating device 16b of the robot R1. Otherwise, the local manager LM1 uses the public line communicating device 28a to communicate with the public line communicating device 16a.

Then, upon reception of an instruction of an action, the robot R1 takes an action such as move, gesture or speech in accordance with the instruction (STEP SR2). The robot R1 uses the action determining section 14 to determine an action in accordance with surrounding situations confirmed by the image processing section 11, information detected by the gyro sensor SR1 and the GPS receiver SR2, and audio recognized by the audio recognizing section 12b. Moreover, the robot R1 uses the self-moving control section 15 to keep walking by driving the head, arm and leg portions R11, R12 and R13.

The robot R1 walks while photographing surrounding area by use of the cameras C, C and confirming persons or obstacles by use of the image processing section 11. Further, every time recognizing a person's face, the robot R1 sends the position of the face to the local manager LM1. Besides, the robot R1 sends the photographed images to the local manager LM1 by use of the image sending section 13, as well as sends the information detected by the gyro sensor SR1 and the GPS receiver SR2 thereto through the wireless communicating section 16 (STEP SR3).

The local manager LM1 receives, from the robot R1, the image, the information about the position of the face and the information detected by the gyro sensor SR1 and the GPS receiver SR2. Then, the local manager LM1 identifies the current position of the robot R1, based on these images and information, and updates the current position in the global map 21. Further, the information collection section 25 refers to the current position in the global map 21, acquires contents corresponding to the current position from the content server CS, and stores them therein (STEP SR4)

The operations in the above steps SR1 to SR4 are normally performed by the local manager LM1 and the robot R1 as long as the robot R1 is active, and are thus called a normal operational step SR.

On the other hand, the user accesses the global manager GM through the portable phone T, and requests connection with the robots Rn (STEP S1).

The global manager GM receives the request, uses the menu generation section 33 to generate data for displaying a menu screen, and sends this data to the portable phone T (STEP S2). Then, the menu generation section 33 refers to the contents of the robot management data 31, and produces a menu screen so that only the presently usable robots Rn can be selected. For example, as shown in FIG. 8, the menu generation section 33 generates data of the menu screen 100 that displays the character strings 101 indicating where the robots Rn are disposed, the radio buttons 102 for selection, and the connect button 103.

On a display of the user's portable phone T, the menu screen 100 is displayed, and the user requests the connection with the local manager LM1 by selecting, for example, "ox department store" and by pushing the connect button 103 (STEP S3).

The connection management section 29 in the local manager LM1 connects the portable phone T with the robot R1 in response to the request from the portable phone T, and starts the timer to measure time of use. Here, this measurement may be done while the timer is continuously working.

The connection management section 29 updates the number of the connections, and sends the number to the global manager GM (STEP S4).

The utilization management section 32 in the global manager GM receives the number, and updates the robot management data 31 in accordance with the received number (STEP S5).

The local manager LM1 and the robot R1 repeat the above normal operational step SR, while the robot R1 sends the photographed images to the local manager LM1.

Figure 9:
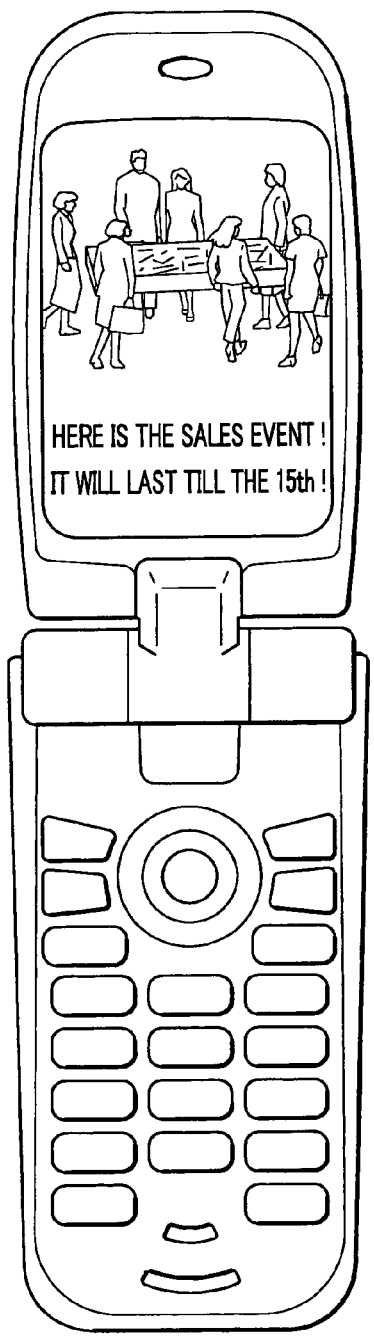
FIG. 9 is a view depicting an example of an image displayed on a portable phone T.

The information superimposing section 26 in the local manager LM1 superimposes the contents collected by the information collection section 25 on the image sent from the robot R1, thereby generating superimposed data (STEP S6). The image displayed by the superimposed data is one as shown in FIG. 9, for example. If the user selects the robot R1 disposed at "ox department store", that is, at the position P3 (see FIG. 5) on the global map 21, then the content server CS acquires the character information "Here is the sales event. It will last till the 15th." as shown in FIG. 4. Hence, the image in which the character "Here is the sales event. It will last till 15th." is superimposed on a scene of the sales event photographed by the robot R1 at the position P3 is displayed.

Figure 10:
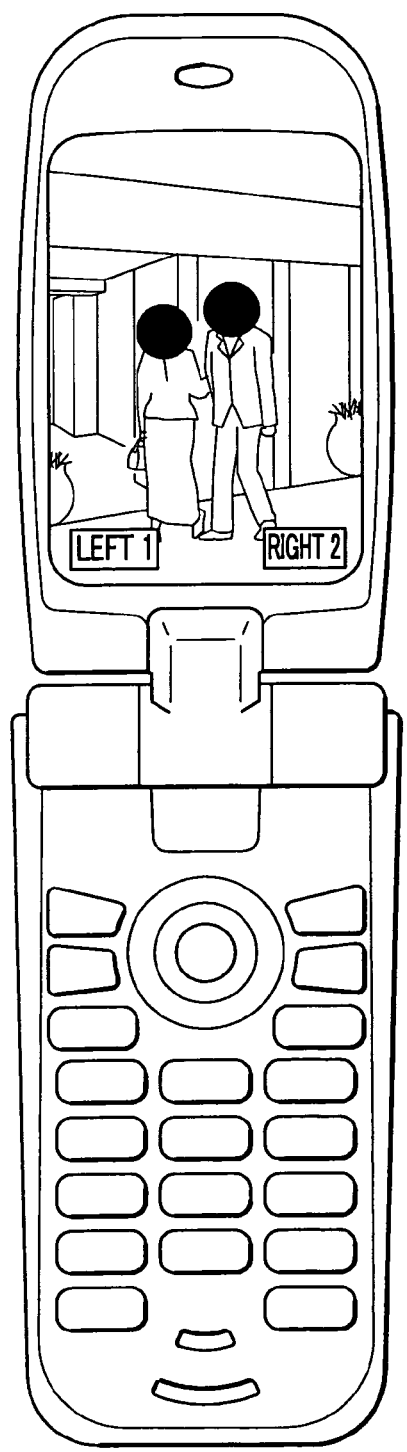
FIG. 10 is a view depicting another example of the image displayed on the portable phone T.

Also, upon reception of the image containing information about the positions of faces from the robot R1, the information superimposing section 26 overlaps black circles at the positions of the faces as shown in FIG. 10 (referred to as "cover-up processing"). This cover-up processing may be any processing with white circles, mosaic, blurring, smile marks or the like, as long as faces are hidden.

Moreover, if the robot R1 is disposed within a usable area, then an image indicating how to operate the robot R1 may be displayed on the lower place of the screen, as shown in FIG. 10. In an example of FIG. 10, the operation method for changing the orientation of face (head portion R11) of the robot R1 is displayed. Here, push of "1" makes the face turn left, whereas push of "2" makes the face turn right.

The portable phone T displays image data sent from the local manager LM1 on its display (STEP S7).

As shown in FIG. 10, if the robot R1 is operable, the user operates the buttons on the portable phone to provide an instruction of an operation to the robot R1 (STEP S8).

Once the robot R1 receives this instruction while repeating the normal operation step SR, the action instruction section 24 in the local manager LM1 assigns this instruction to the highest possible priority. Further, the action instruction section 24 provides the robot R1 to the instruction again (STEP SR1' and normal operational STEP SR').

When stopping the use of the robot R1, the user requests the disconnection through the portable phone T (STEP S9), so that the connection with the local manager LM1 is logged out (STEP S10). Then, the connection management section 29 updates the number of the connections, and sends this number to the global manager GM (STEP S10). Additionally, the utilization management section 32 in the global manager GM updates the contents of the robot management data 31 (STEP S11).

Alternatively, without the request of the disconnection from the user, the connection with the local manager LM1 may be logged off when the timer in the local manager LM1 counts a predetermined time.

If a plurality of users direct the operation of the robot R1 at the same time, then it is preferable that the local manager LM1 selects one from the users, based on a majority rule, i.e. the number of pushing the button "L", or "R" of the portable phone T during a predetermined period (see FIG. 8). In this case, it is preferable that the time when one user can operate the robot R1 is set as several minutes such as 3 minutes. Alternatively, a user may be selected based on the frequency of the operation commands sent by pushing the button "L" or "R".

As described above, it is possible for a user to access the robots Rn through the portable phone T, and to view images produced by superimposing information related to the places of the robots Rn on the images photographed by the robots Rn. Alternatively, a user can select any given robot from the robots Rn to thereby remotely operate the robot. Further, the robot administrators M can distribute, to a user, images produced by interposing additional information on images showing local situations around the robots Rn. As a result, the robot administrators M can present advertisements of events or information offering service.

Also, should the robots Rn photograph faces of persons, the faces undergo the cover-up processing, thus enabling protection of privacy of the persons.

Moreover, by appropriately switching the public line communicating device 28a to the private line communicating device 28b, the time period of using a pay line is shortened as much as possible, which enables reductions in communication fees. A conventional method by which the communicating devices are switched depending on radio field intensity may achieve considerable long-distance communication, unless there are obstacles between the robot R1 and the local manager LM1. However, if obstacles pass between the robot R1 and the local manager LM1 while the robot R1 is away from the local manager LM1, or if the robot R1 goes behind an obstacle, then the radio field intensity emitted from the access point of the local manager LM1 is reduced, which may cause the disconnection. In contrast, in this embodiment, a method by which the communicating devices are switched depending on the geographic position of the robot R1 is employed. This method can allow a safety margin for the disconnection, so that the possibility of the disconnection is decreased.

The embodiment of the present invention in a case where the moving body is the robot has been described above, but the present invention is not limited to this embodiment, and can be carried out with appropriate modifications.

To give an example, the images photographed by the robot R1 are deleted so that they are not maintained in the robot R1 and the local manager LM1. In this way, it is possible to prevent privacy of photographed persons.

Moreover, the portable phone is configured not to store the images, whereby the privacy can be more reliably protected.

The images may be either still images or dynamic images.

A communicating means is not limited to one described in this embodiment, but appropriate means can be employed.

The robot administrators may edit data in the global map 21, whereby the operational patterns of the robot R1 can be varied, or new patterns can be created and added thereto.

(In the Case Where the Moving Body is a Vehicle)

Next, an embodiment will be described of the case where the moving body included in an image distribution system according to the present invention is a vehicle. Here, for the sake of understanding, this embodiment will be described by appropriately taking a vehicle that is joining an auto race, as an example.

As shown in FIG. 1, an image distribution system 1 includes a vehicle V3 as a moving body, a local manager LM3 that manages various operations of the vehicle V3, a global manager GM, a portable phone T as a portable terminal owned by a user, and a content server CS.

Incidentally, in this figure, the vehicle V3, which is the moving body, is shown alone, but a plurality of vehicles are, in fact, included in the image distribution system 1 according to the present invention.

In a following description, the vehicles are referred to as "vehicles Vn" unless specified otherwise.

The vehicles Vn which are included in the image distribution system 1 incorporate the respective local managers LMn. These local managers LMn, the global manager GM and the content server CS are connected to one another through a network NW. The local managers LMn are connected to the network NW through a connecting device owned by a portable phone company TC or through certain access points AP, and the portable phone T is also connected to the network NW through the connecting device of the portable telephone company TC.

Thereinafter, structures of an image processing section 50, the local manager LM3 and the global manager GM provided in the vehicle V3 will be described.

[Vehicle V3]

Figure 12:
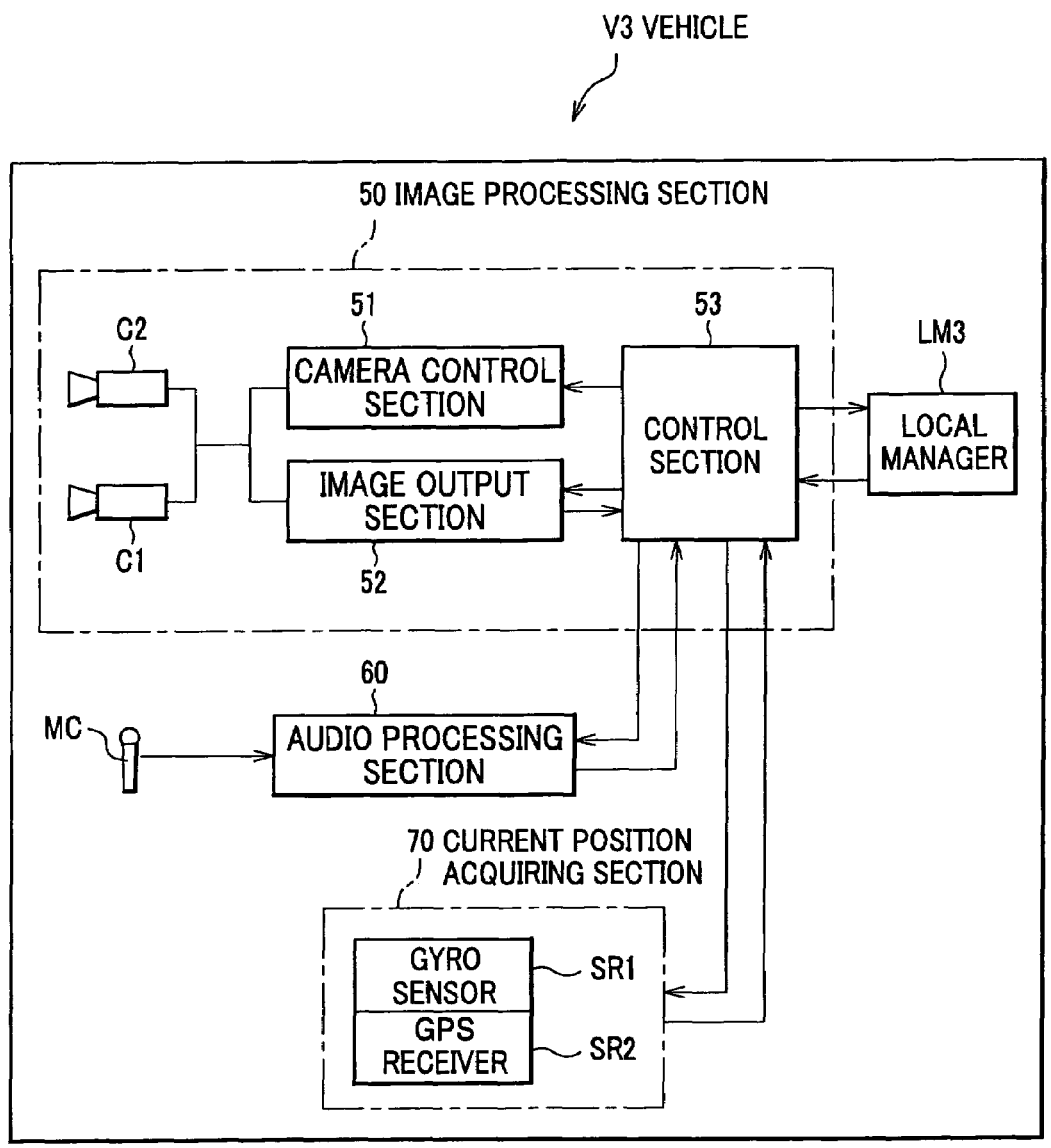
FIG. 12 is a view depicting a block diagram of a vehicle V3.

As shown in FIG. 12, the vehicle V3 includes at least the image processing section 50 and the local manager LM3.

The image processing section 50 in this embodiment includes cameras C1, C2, a camera control section 51, an image output section 52 and a control section 53, and generates image data, based on images photographed by the cameras C1, C2.

The camera control section 51 switches between the cameras C1, C2 and adjusts the orientations thereof, based on a camera control signal sent from the control section 53.

The cameras C1, C2 used in this embodiment can capture images in a digital format as with the cameras C, C in the robot R1 described above, and each may be a color CCD (charge-coupled device) camera, for example.

The cameras C1, C2 are disposed facing in the predetermined, different directions from each other, such as forward and rear directions. Alternatively, one of the cameras C1, C2 may be omitted. If the cameras C1, C2 are used, then any of these cameras are selected by the control section 53, and the selected camera photographs. However, the selected number of the cameras is not limited to one, but two cameras may be selected at the same time.

The image output section 52 generates image data, based on images photographed by the cameras C1, C2, and outputs this image data to the control section 53.

Specifically, in this embodiment, the image output section 52 outputs, to the control section 53, the image data generated from the images photographed by the camera selected at present (for example, the camera C1), upon receipt, from the control section 53, of a data acquiring command signal that will be described later.

In this case, if the camera C1 is disposed on the front grille of the vehicle V3, the image output section 52 generates image data from an image photographed in the forward direction of the vehicle V3, and outputs this image data to the control section 53.

An audio processing section 60 generates audio data, based on sound picked up by a microphone MC while the camera C1 or C2 photographs, and outputs this audio data to the control section 53.

Specifically, in this embodiment, the audio processing section 60 generates the audio data, based on sound picked up by the microphone MC, such as engine or surrounding sound, when receiving, from the control section 53, the data acquiring command signal, and outputs this audio data to the control section 53.

A current position acquiring section 70 includes a gyro sensor SR1, a GPS receiver SR2 and the like, generates data indicating a current position of the vehicle V3 (position data) and outputs this position data to the control section 53.

Specifically, in this embodiment, the current position acquiring section 70 generates the position data indicating the current position of the vehicle V3 by use of the gyro sensor SR1, the GPS receiver SR2 and the like, upon receipt of the data acquiring command signal sent from the control section 53, and outputs the generated position data to the control section 53.

The control section 53 acquires various data (the image, audio or position data), in response to a command signal (data request signal) sent from the local manager LM3.

Specifically, when receiving the data request signal, the control section 53 generates a camera control signal for adjusting orientations of the cameras C1, C2 and for switching between the cameras C1, C2 to be used, and outputs this camera control signal to the camera control section 51. Further, the control section 53 generates a signal for requesting the output of data (data acquiring command signal), and outputs this data acquiring command signal to the image output section 52, the audio processing section 60 and the current position acquiring section 70.

Subsequently, the image output section 52, the audio processing section 60 and the current position acquiring section 70 receive the data acquiring command signal, and output the image, audio and position data to the local manager LM3, respectively.

Note that the data acquiring command signal does not always need to be sent to all of the image output section 52, the audio processing section 60 and the current position acquiring section 70. For example, when the user of the portable phone T requests an image only, the data acquiring command signal is sent to the image output section 52 and the current position acquiring section 70 except the audio processing section 60. In this case, the control section 53 outputs the image data and the position data to the local manager LM3.

[Local Manager LM3]

The local manager LM3 sends, to the global manager GM, connect information for determining the possibility of the connection between the portable phone T and the vehicle V3, and outputs image data to the portable phone T if the connection is permitted.

Figure 13:
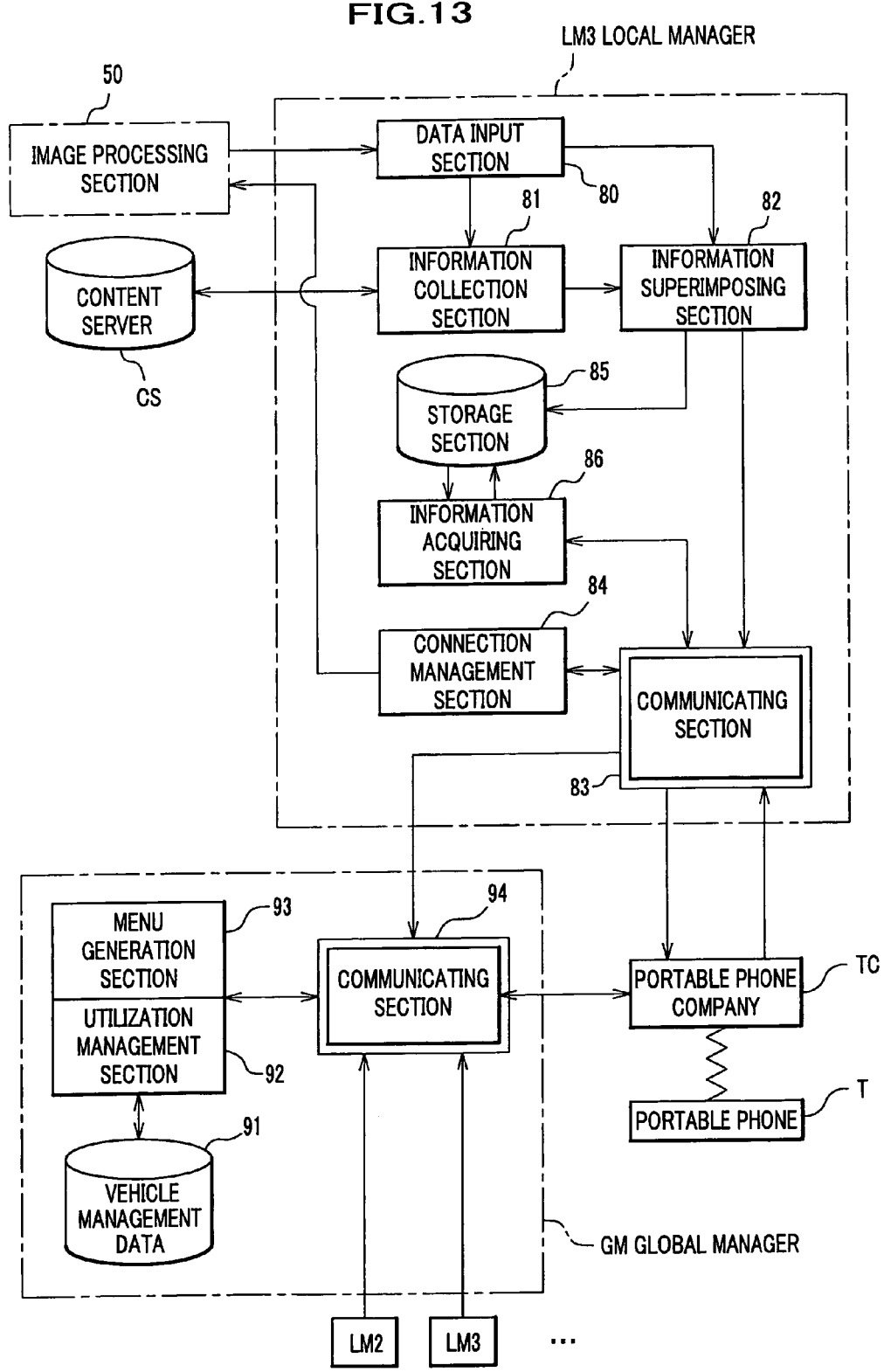
FIG. 13 is a functional block diagram of a local manager LM1 and a global manager GM.

As shown in FIG. 13, the local manager LM3 includes a data input section 80, an information collection section 81, an information superimposing section 82, a communicating section 83, and a connection management section 84.

The data input section 80 outputs, to the information superimposing section 82, the image, audio and position data sent from the image processing section 50, as well as outputs the position data to the information collection section 81.

The information collection section 81 reads the position data sent from the data input section 80, retrieves, from a content server CS, contents related to this position data, and outputs the retrieved content data to the information superimposing section 82.

For example, when the vehicle V3 joins an auto race, the information collection section 81 in the vehicle V3 refers to the contents in the content server CS, based on the position data, and acquires the contents related to the position data.

In this embodiment, as shown in FIG. 14, the content server CS stores, in relation to the position data, information on where the current position identified based on the position data is located on a race circuit.

Therefore, when the current position of the vehicle V3 is denoted by position data P1, the information collection section 81 acquires text data "around S-curve" related to the P1.

Then, the information collection section 81 generates content data containing this text data and the position data, and outputs this content data to the information superimposing section 82.

The information superimposing section 82 superimposes the text data contained in the content data sent from the information collection section 81 on the image data sent from the data input section 80.

Specifically, the information superimposing section 82 receives the position data together with the image data from the data input section 80, acquires, from the information collection section 81, the text data contained in the content data related to the received position data, and superimposes the acquired text data on the received image data. As a result, the superimposed data is produced.

This superimposition may be attained by superimposing bitmap data of characters and of texts on the image information. Alternatively, if the portable phone T or another portable terminal can display documents of a format containing letters and images, such as HTML documents, then data to which tags are added may be generated so that the data is suited for this format.

For example, if the vehicle V3 joins an auto race, and if the information collection section 81 collects the text data "around S-curve", then superimposed data in which this text data is superimposed on the image data generated based on an image photographed by the camera C1 or C2 is generated.

Figure 17:
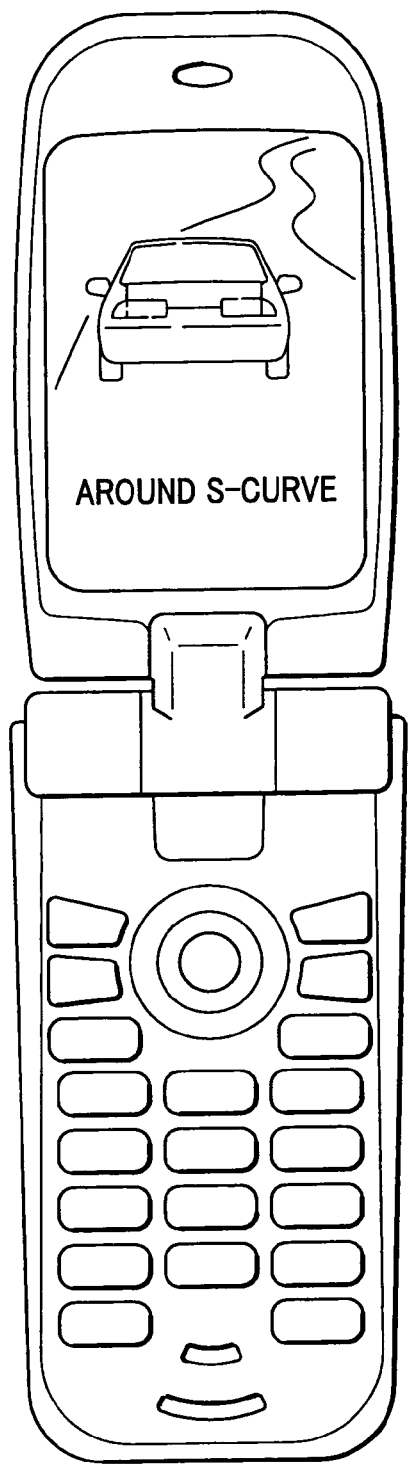
FIG. 17 is a view depicting an example of an image shown on a portable phone T.

Thus, although described in detail later, when the portable phone T acquires the above superimposed data, an image as shown in FIG. 17 is displayed on the screen of the portable phone T.

Although the information to be superimposed corresponds to the contents stored in the content server CS, the information may contain not only characters but also images. For example, when the operation of the portable phone T of the user executes the switching between the cameras C1, C2 or the adjustment of the orientations thereof, the superimposed data in which an operation button as operation guidance or a figure illustrating the description of the operation is superimposed on the image data may be generated. Such superimposed data would facilitate the operation of the user.

The communicating section 83 communicates with the portable phone company TC (or portable phone T) and the global manager GM, and typically plays a role in connecting with the Internet.

Hence, the superimposed data produced by the information superimposing section 82 is sent to the portable phone T through the communicating section 83 and the connecting device of the portable phone company TC.

The connection management section 84 determines possibility of the connection with the portable phone T of the user, and manages the number of the portable phones T being in connection with the local manager LM3 at present.

Additionally, when receiving a signal for requesting sending of an image, etc. to the portable phone T from the portable phone T through the communicating section 83, the connection management section 84 generates a signal for outputting the image, audio or position data (data request signal), and outputs this data request signal to the image processing section 50.

The connection management section 84 increments the number of the connections by one whenever another portable phone T connects with the local manager LM3, and decrements it by one whenever one of the connected portable phones T disconnects therefrom. Further, the connection management section 84 sends, to the global manager GM through the communicating section 83, the current number of the connections every time the number changes. Alternatively, the connection management section 84 determines the possibility of the connection, and may then send, to the global manager GM, only information about the possibility in stead of the current number. Specifically, if the current number is less than a predetermined value, then the connection management section 84 sends, to the global manager GM through the communicating section 83, information on the approval of the connection (connect approval signal). Otherwise, it sends information on the disapproval (connect disapproval signal) thereto.

[Global Manager GM]

A global manager GM includes vehicle management data 91, a utilization management section 92, a menu generation section 93 and a communicating section 94.

The vehicle management data 91 is for managing the utilization of multiple vehicles included in the image distribution system 1, and is stored in a memory device owned by the global manager GM.

FIG. 15 shows the contents of the vehicle management data 91. As shown in FIG. 15, the vehicle management data 91 is a collection of data for each of the vehicles Vn, The data for each of the vehicles Vn contains information about "VEHICLE NAME", "CONNECTED NUMBER", "CONNECTABLE NUMBER", "UTILIZED POSSIBILITY", and "CONNECTED DESTINATION", using IDs (V1, V2, . . . Vn (n is an arbitrary integer)) of the vehicles Vn as specific identification keys.

The field of "VEHICLE NAME" designates the names of the vehicles equipped with the cameras, and contains character information regarding the names.

"CONNECTED NUMBER" designates the number of the portable phones T being in connection with each of the vehicles Vn at present.

"CONNECTABLE NUMBER" designates the number of the portable phones T which are connectable to each of the vehicles Vn at the same time. "CONNECTABLE NUMBER" is set for each of the vehicles Vn. This number is as same as that set in the connection management section 84 of each of the local manager LM3.

The field of "UTILIZED POSSIBILITY" contains, as a character of "o" or "x", information about whether the vehicles Vn can be used. This information may be another one such as "0" or "1" as long as the utilized possibility is identified. Here, if "CONNECTABLE NUMBER" for one of the vehicles Vn is set as 1, then only one user (or one portable terminal) can exclusively use the one of the vehicles Vn, and if "CONNECTABLE NUMBER" therefor is more than 1, then a plurality of users share the one of the vehicles.

The field of "CONNECTED DESTINATION" contains IP addresses of the vehicles Vn to be connected.

The utilization management section 92 manages the utilization of the vehicles Vn. Every time receiving the current number of the connections from the local manager LM3 in the vehicle V3, the utilization management section 92 updates the number of the connections for the vehicle V3 in the vehicle management data 91. Further, the utilization management section 92 compares the updated connectable number for the vehicle V3 with the current connected number therefor. If the connectable number is greater than the connected number, then the utilization management section 92 sets the utilized possibility as "o". Otherwise, "x".

Figure 16:
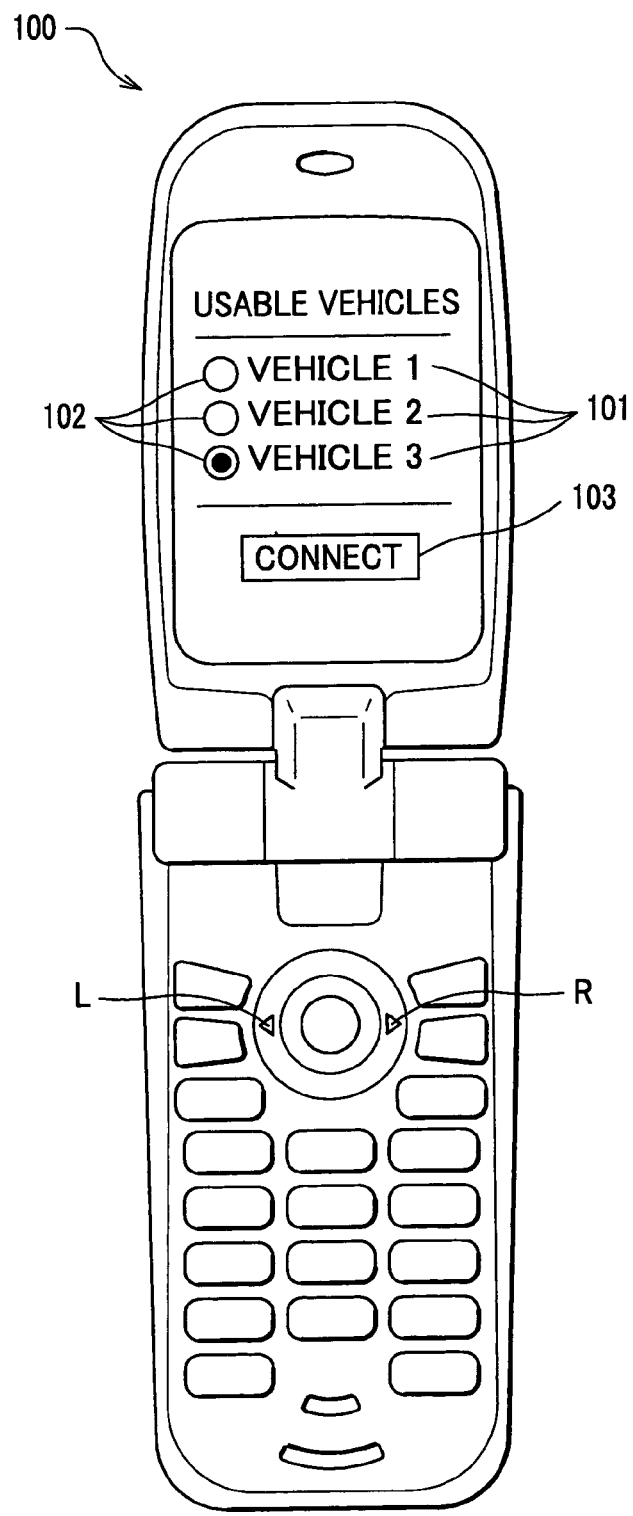
FIG. 16 is a view depicting an example of a menu screen.

When receiving a request for the connection with the vehicles Vn from the user through the portable phone T, the menu generation section 93 produces a menu screen containing a utilization selection portion of the vehicles Vn, and simultaneously sends data for displaying the menu screen to this portable phone T. For example, the menu generation section 93 generates data for displaying a menu screen 100 as shown in FIG. 16.

Concretely, on receiving the request for the connection from the portable phone T through the communicating section 94, the menu generation section 93 refers to the field on "UTILIZED POSSIBILITY" of the vehicle management data 91, and extracts only the usable vehicles Vn therefrom. Moreover, the menu generation section 93 generates data for displaying character strings 101 and a selection form which both are aligned in a row. Here, the character strings 101 indicate the usable vehicles Vn, and the selection form, including data radio buttons 102, is for selecting specific vehicles from the usable vehicles Vn. Additionally, the menu generation section 93 sets data of connected destinations of the vehicles Vn, such as IP addresses, as values selected by the radio buttons 102. Furthermore, the menu generation section 93 adds data for displaying a form of a connect button 103 to a part of the screen, and sets a connection to the value selected by the radio buttons 102, in response to the selection from the connect button 103.

[Portable Phone T]

The portable phone T is an example of portable terminals, and may be replaced by a PDA (personal digital assistance) or a notebook personal computer.

Next, operations of the image distribution system 1 including the vehicle V3 will be described with reference to a flow chart of FIG. 18.

Figure 18:
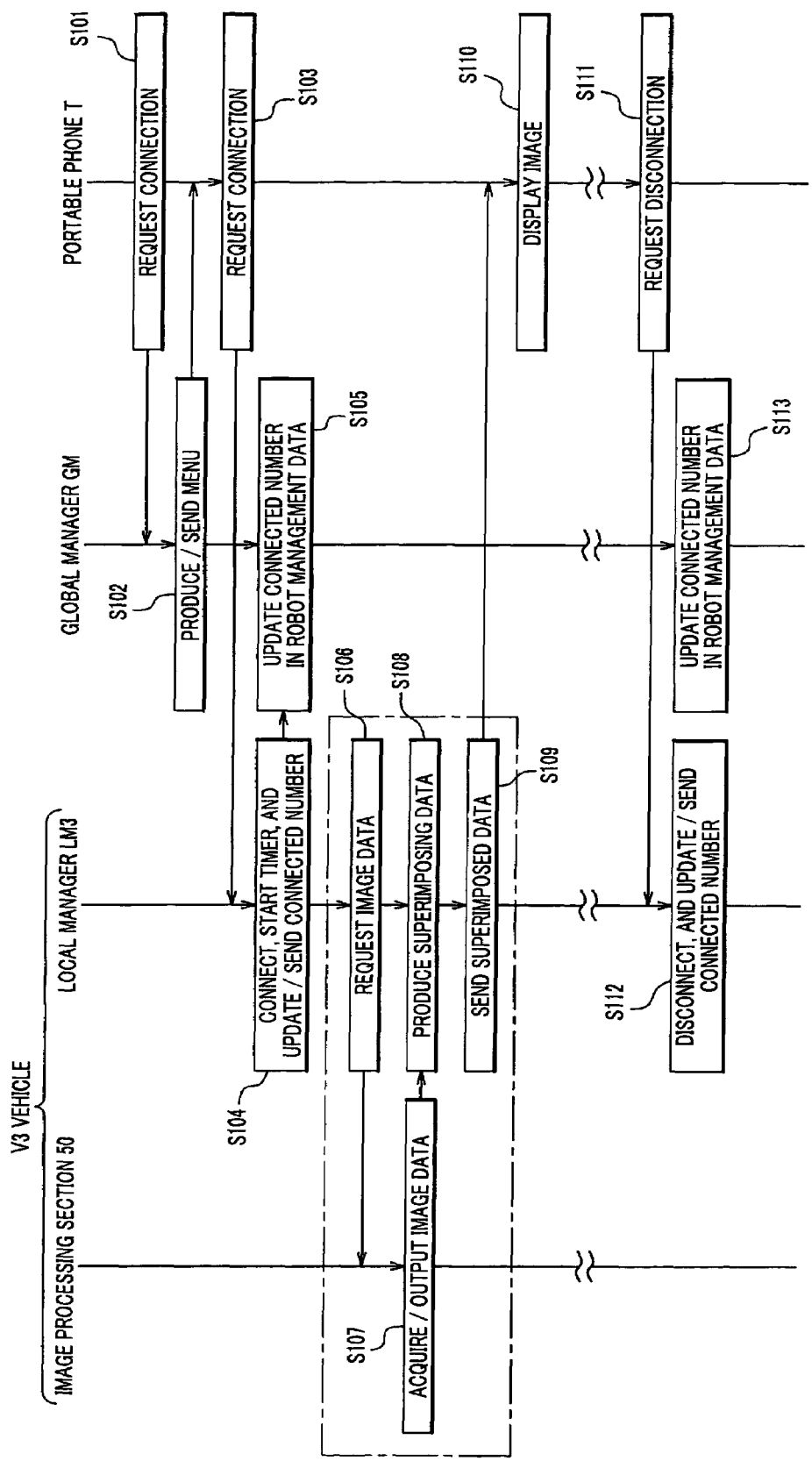
FIG. 18 is a flow chart showing an operation of another aspect of the image distribution system 1 according to the present embodiment of the present invention.

FIG. 18 shows, in a row, respective operations of the image processing section 50 and local manager LM3 in the vehicle V3, the global manager GM and the portable phone T.

The user accesses the global manager GM through the portable phone T, and requests connection with the vehicles Vn (STEP S101).

The global manager GM receives this request, uses the menu generation section 93 to generate data for displaying a menu screen, and sends this data to the portable phone T (STEP S102). Then, the menu generation section 93 refers to the contents of the vehicle management data 91, and produces a menu screen so that only the presently usable vehicles Vn can be selected. For example, as shown in FIG. 16, the menu generation section 33 generates data of the menu screen 100 for displaying the character strings 101. Here, the character strings 101 indicates the usable vehicles Vn, the radio buttons 102 for selection, and the connect button 103.

On a display of the user's portable phone T, the menu screen 100 as shown in FIG. 16 is displayed, and the user requests the connection with the local manager LM3 by selecting, for example, "VEHICLE 3" and by pushing the connect button 103 (STEP S103).

The connection management section 84 in the local manager LM3 connects the portable phone T with the vehicle V3 in response to the request from the portable phone T, and starts the timer to measure time of use. Here, this measurement may be done while the timer is continuously working.

The connection management section 84 updates the number of the connections, and sends this number to the global manager GM (STEP S104).

The utilization management section 92 in the global manager GM receives the number, and updates the vehicle management data 91 in accordance with the received number (STEP S105).

The connection management section 84 in the local manager LM1 outputs, to the image processing section 50, a signal for requesting sending of an image (data request signal) to the portable phone T (STEP S106).

When receiving the data request signal, the control section 53 in the image processing section 50 generates a camera control signal for adjusting the orientations of the cameras C1, C2 or switching between the cameras C1, C2 to be used, and outputs this camera control signal to the camera control section 51. Simultaneously, the control section 53 generates a signal for requesting output of data (data acquiring command signal), and outputs this data acquiring command signal to the image output section 52, the audio processing section 60 and the current position acquiring section 70.

The image output section 52, the audio processing section 60 and the current position acquiring section 70 receive this data acquiring command signal, and output image, audio and current position data to the local manager LM3, respectively (STEP S107).

The information superimposing section 82 in the local manager LM3 superimposes the content data sent from the information collection section 81 on the image sent from the image processing section 50, thereby producing superimposed data (STEP S107)

Here, if the user has selected "VEHICLE 3" from the menu screen 100 (see FIG. 16) in STEP S103 described above, and if the position of the vehicle 3 corresponds to P1, then content data sent from the information collection section 81 is represented by the text data "around S-curve" (see FIG. 14). Accordingly, in the local manager LM3, produced is the superimposed data in which the text "around S-curve" is superimposed on an image photographed by the camera C1 or C2 equipped in the vehicle V3 that runs around an S-curve (STEP S108). Moreover, the su-perimposed data is sent to the portable phone T (STEP 109)).

The portable phone T receives the superimposed data, and displays, on its screen, an image in accordance with the su-perimposed data (STEP S110).

Incidentally, the example of the displayed image is shown in FIG. 17.

In this figure, shown is the image which is acquired through the camera C1 or C2 disposed on the front grille of the vehicle V3. This image presents a scene where the vehicle V3 equipped with the cameras C1, C2 is following another vehicle around an S-curve of a race circuit.

The vehicle V3 repeats the normal operation step SR (STEPS S106 to S109).

When stopping the use of the vehicle V3, the user requests the disconnection from the vehicle V3 through the portable phone T (STEP S111).

In response to this request, the local manager LM3 stops producing and sending the superimposed data, and logs out the connection with the portable phone T. Then, the connection management section 84 sends, to the global manager GM, the number of the portable phones T being in connection with the vehicle V3 at present (STEP S112).

The utilization management section 92 in the global manager GM updates the contents of the vehicle management data 91 (STEP S113).

The embodiment of the present invention in a case where the moving body is the vehicle has been described above, but the present invention is not limited to this embodiment, and can be carried out with appropriate modifications.

Incidentally, the images used in this embodiment may be either still images or dynamic images.

In this embodiment, for example, the image processing section 50 generates the image data, in response to the data request signal from the local manager LM3, and outputs the produced image data to the local manager LM3. Alternatively, without the data request signal, the image processing section 50 may continue producing the image data and outputting it to the local manager LM3, at prescribed intervals.

In this case, the superimposed data produced by the information superimposing section 82 is sequentially stored in a storage section 85 of the local manager LM3. Every time receiving the image request signal from the portable phone T, the local manager LM3 uses an information acquiring section 86 to acquire the target superimposed data from the storage section 85, and presents this data to the portable phone T. In such a manner, images can be distributed.

Up to this point, the embodiment had been described in the case where the two cameras C1, C2 are installed in the vehicle V3. However, the number and the type of these cameras are not limited to those in this embodiment.

For example, an omnidirectional camera which can provide panorama images may be installed in stead of the cameras C1, C2. In this case, the camera control section 51 is not required, and the images with a certain view angle can be obtained based on the instruction from the control section 53.

Alternatively, a camera which is mounted on a stage rotatable 360 degrees (not shown) may be provided in stead of the cameras C1, C2. In this case, the camera can photograph while the stage is rotated by the camera control section 51 in a certain direction.

Note that the moving bodies included in the image distribution system according to the embodiments of the present invention are not limited to a single type of objects such as robots or vehicles, but different types can be employed in combination. Moreover, the moving bodies can also be applied to airplanes or the like as appropriate.

From the aforementioned explanation, those skilled in the art ascertain the essential characteristics of the present invention and can make the various modifications and variations to the present invention to adapt it to various usages and conditions without departing from the spirit and scope of the claim.

What is claimed is:

1. An image distribution system comprising:
   a plurality of robots, each of the robots including a moving body;
   a plurality of local managers for managing operations of the moving bodies, respectively;
   a plurality of portable terminals;
   a global manager for managing communication connections between the robots and the portable terminals;
   a content server;
   each of the robots comprising:
      a biped walking self-moving device for operating in accordance with an instruction from a corresponding local manager of the local managers;
      an instruction input section for receiving an instruction on a movement of the self-moving device;
      a camera; and
      an image output section for outputting an image photographed by the camera to the local manager;
   each of the local managers comprising:
      an image input section for receiving the image outputted from a corresponding robot of the robots;
      a global map for setting an action plan of the robot;
      an action instruction section for directing the robot to take an action, based on the global map;
      an information collection section for receiving, from the content server, contents being related to a current geographic position of the robot, based on the global map;
      an information superimposing section for producing superimposed data in which the contents received by the information collection section is superimposed on the image received by the image input section;
      an image sending section for sending the superimposed data to a corresponding portable terminal of the portable terminals; and
      a connection management section for sending, to the global manager, connection information for determining possibility of a connection with the robot; and
   the global manager including a menu generation section which, upon receipt of a connection request from one portable terminal out of the portable terminals, generates a menu screen to be displayed on the portable terminal, based on pieces of the connection information sent from the local managers, and which substantially sends, to the portable terminal, the menu screen including at least a utilization selection section of the robots.

2. A image distribution system according to claim 1, wherein each of the robots further comprises a face recognizing section for recognizing a position of a face of a person in the image photographed by the camera, and
wherein either the robots or the local managers each further comprise a cover-up processing section for hiding the face in the image, based on the position of the face of the person recognized by the face recognizing section.

3. A image distribution system according to claim 1 or 2, wherein both the robots and the local managers each comprise a private line communicating device for performing short-length communication therebetween and a public line communicating device for connecting therebetween through a public line, and
wherein each of the local managers comprises a communication switching section which refers to the global map to thereby determine whether the current geographic position of the robot is located within a connectable area of the private line communicating device, and which switches between the private line communicating device and the public line communicating device in such a manner that the private line communicating device communicates with the robot on the condition that the robot is determined to be located within the connectable area and that the public line communicating device communicates with the robot on the condition that the robot is determined to be located outside the connectable area.

4. A image distribution system according to claim 1, wherein the action instruction section directs the robot to take an action, based on an operation instruction sent from one of the portable terminals, and, upon receipt of operation instructions from the portable terminals simultaneously, selects one portable terminal from the portable terminals in a predetermined manner to subsequently accept an operation instruction from the selected portable terminal.

5. A image distribution system according to claim 4, wherein the portable terminal selected by the action instruction section sends operation instructions most frequently in the portable terminals during a predetermined period.

6. An image distribution system comprising:
   a plurality of moving bodies;
   a plurality of portable terminals;
   a global manager for managing communication connections between the moving bodies and the portable terminals;
   a content server;
   each of the moving bodies includes an image processing section and a local manager;
      the image processing section comprising:
         a camera; and
         an image output section for outputting an image photographed by the camera;

the local manager comprising:
- a data input section for receiving the image outputted by the image output section;
- an information collection section for receiving, from the content server, contents related to its own current geographic position;
- an information superimposing section for producing superimposed data in which the contents received by the information collection section are superimposed on the image received by the image input section;
- an image sending section for sending the superimposed data to a corresponding portable terminal of the portable terminals; and
- a connection management section for sending, to the global manager, connection possibility information being used for determining possibility of a connection with the portable terminal; and the global manager including a menu generation section which, upon receipt of a connection request from one portable terminal out of the portable terminals, generates a menu screen to be displayed on the portable terminal, based on pieces of the connection possibility information sent from the local managers, and which subsequently sends, to the portable terminal, the menu screen including at least a utilization selection portion for the moving bodies.

* * * * *